Dec. 27, 1927.  
F. S. WHITLOCK  
1,654,198  
PLATE GLASS MANUFACTURE  
Filed March 29, 1926  
3 Sheets-Sheet 1

INVENTOR  
Frank S. Whitlock  
BY  
HIS ATTORNEY

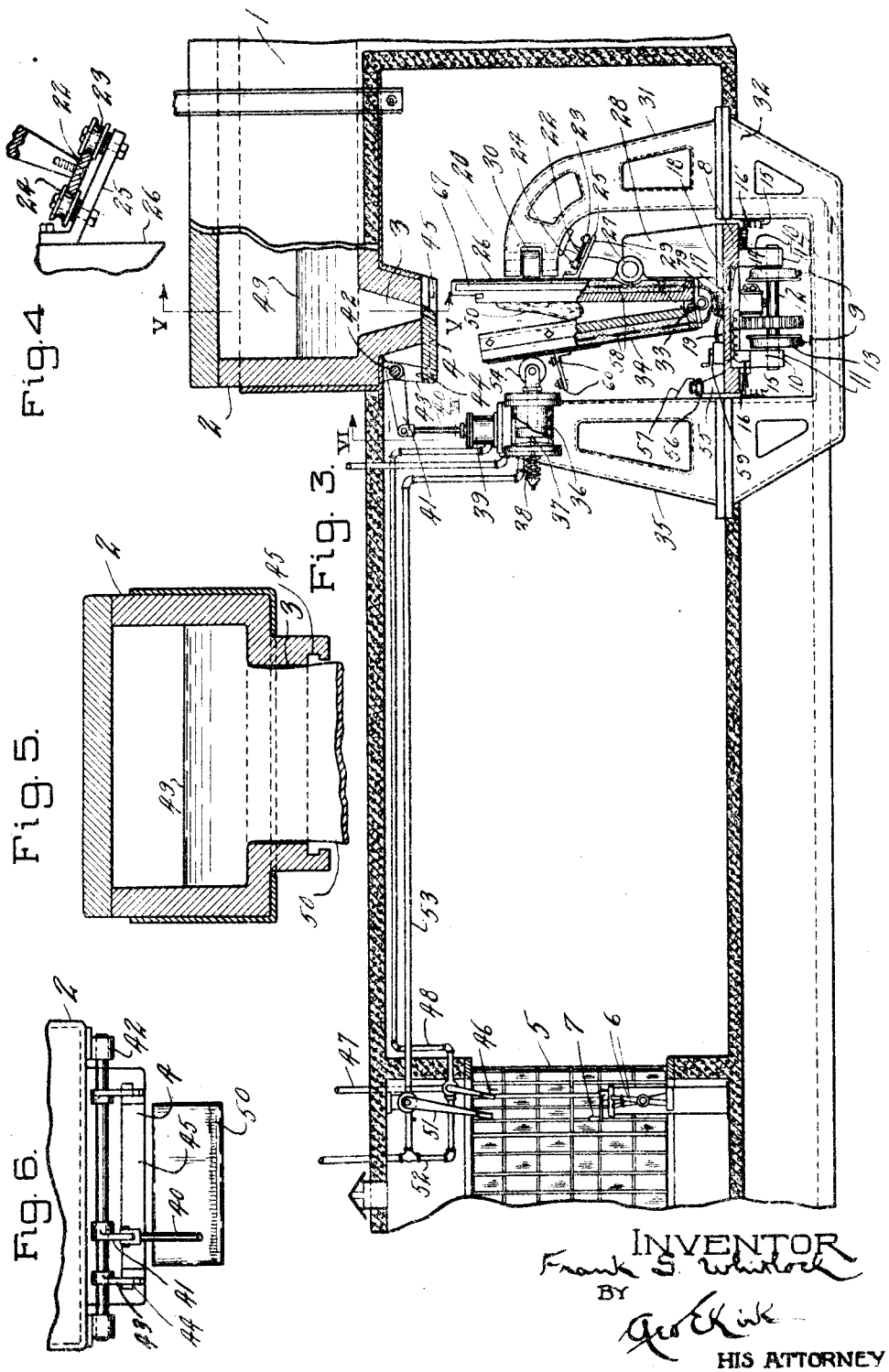

Dec. 27, 1927.  
F. S. WHITLOCK  
1,654,198  
PLATE GLASS MANUFACTURE  
Filed March 29, 1926  
3 Sheets-Sheet 3
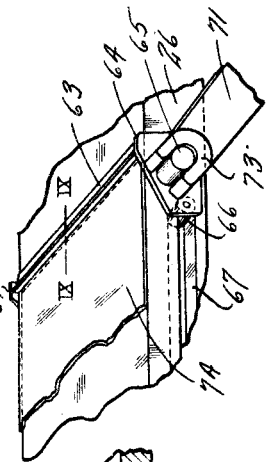
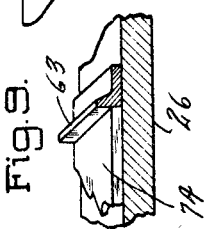
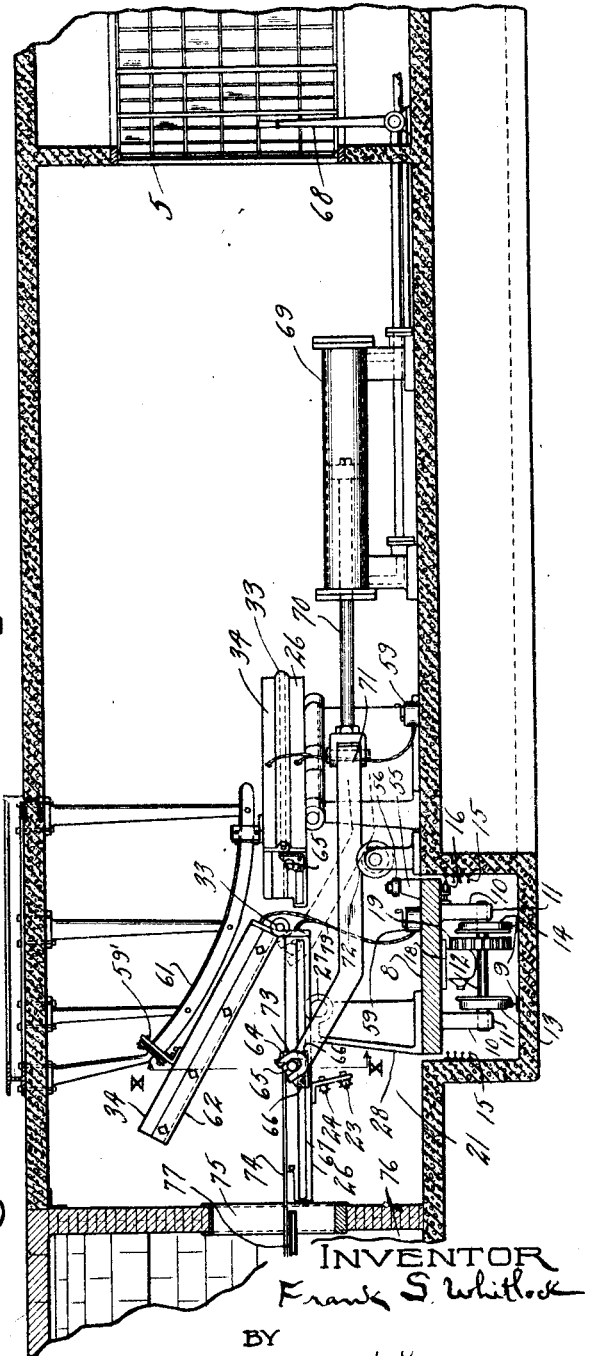
INVENTOR
Frank S Whitlock
BY
Geo E Kirk
HIS ATTORNEY Patented Dec. 27, 1927.

1,654,198

UNITED STATES PATENT OFFICE.

FRANK S. WHITLOCK, OF ROSSFORD, OHIO, ASSIGNOR, BY MESNE ASSIGNMENTS, TO COMMERCIAL SAVINGS BANK & TRUST COMPANY, OF TOLEDO, OHIO.

PLATE-GLASS MANUFACTURE.

Application filed March 29, 1926. Serial No. 98,092.

This invention relates to shaping molten material into slabs or plates.

This invention has utility when incorporated in the production of sheet glass, especially as a finished plate.

Referring to the drawings.

Figure 1:
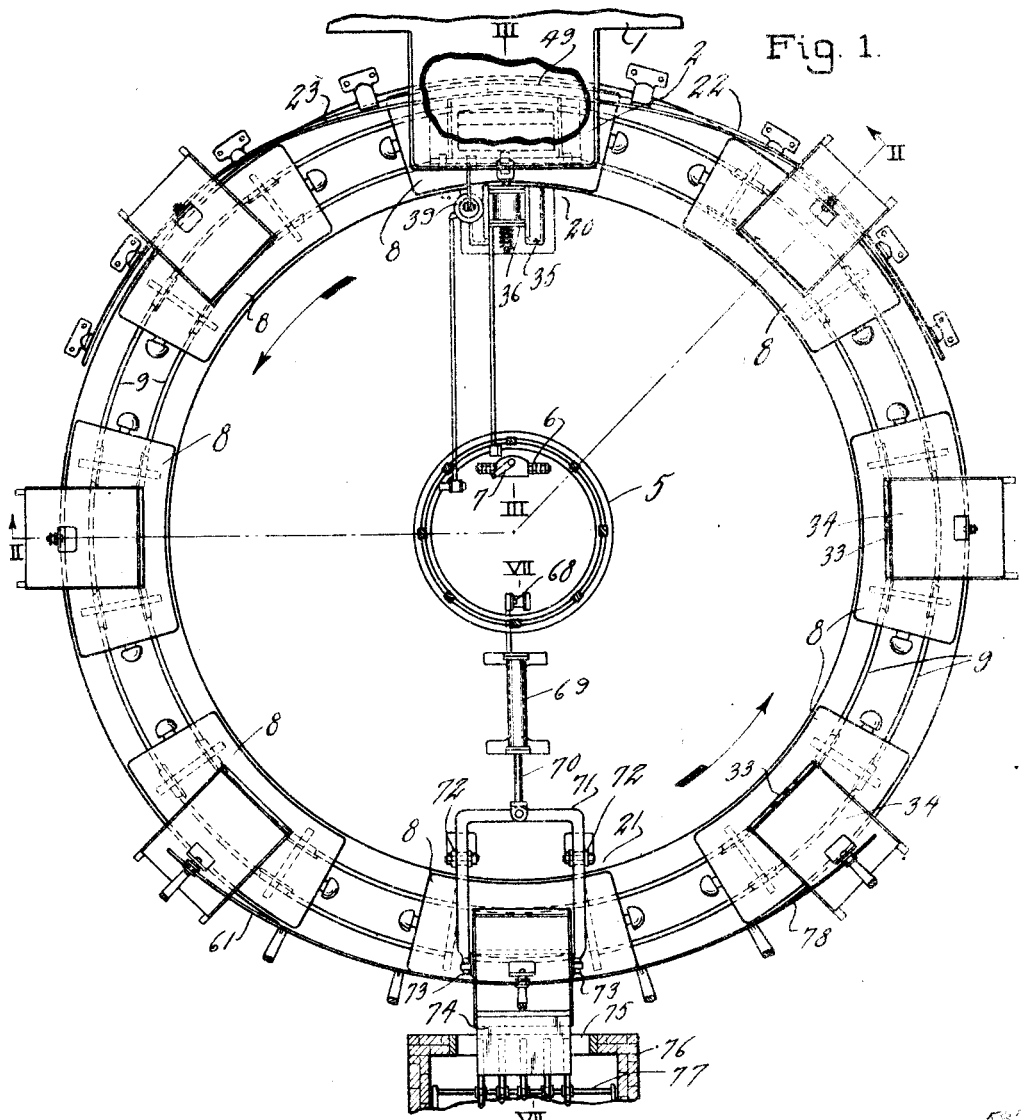
Fig. 1 is a plan view, with parts broken away, of an embodiment of the invention for the manufacture of glass sheets or plates, as for windshields, automotive glass, windows, show-cases, etc.
Figure 2:
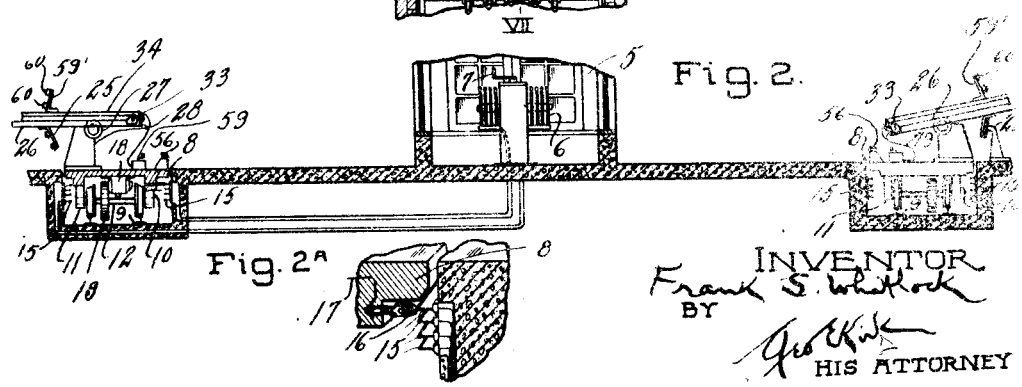
Fig. 2 is a section on the line II—II, Fig. 1.

Fig. 2^A is an enlarged detail of a trolley or electric rolling contact between the car or carrier and the stationary current supply;

Fig. 3 is a fragmentary view on an enlarged scale on the line III—III, Fig. 1;

Fig. 4 is an enlarged detail view of the guiding connection for the swinging upward of the lower or hinge carrying plate or member of the mold;

Fig. 5 is a section on the line V—V, Fig. 3;

Fig. 6 is a view on the line VI—VI, Fig. 3;

Fig. 7 is a section on the line VII—VII, Fig. 1;

Fig. 8 is a fragmentary detail view of the ejecting means for the plate from the mold;

Fig. 9 is an enlarged section on the line IX—IX, Fig. 8;

Fig. 10 is a section on the line X—X, Fig. 7; and

Fig. 11 is an enlarged detail view of the upper mold member lifting guide connection.

Molten glass tank 1 has overhang 2 from which there is discharge slot 3 which may be normally closed by shear 4 (Fig. 3). Control station 5 has therein hand levers 6 and starting lever 7 for selecting by hand levers 6 car 8, and by control lever 7 determining the travel of such car on track 9, herein shown as endless and of circular form. The carrier or car 8 is shown as having downwardly extending brackets 10 (Figs. 3, 7) providing journals 11 for axles 12 carrying wheels 13, 14, for rolling on the tracks 9. Each hand lever 6 has connection to a terminal 15 connecting by a rolling contact 16, as a trolley, with line 17 extending to motor 18 effective through gearing 19 to propel the car 8 along the track 9.

The track 9 is shown as having charging station 20 and discharging or ejecting station 21. As the car 8 travels counter-clockwise from the station 21 to the station 20, fixed guide 22 (Fig. 4) has rollers 23, 24, mounted on bracket 25 coact with such fixed guide 22 during the car travel and thus effect swinging of plate mold member 26 on hinge 27 (Fig. 3) at its support or mounting on bracket 28 carried by the car 8. This swinging of the mold member 26 is from horizontal rest position on ledge 29 of the bracket 28 to upright, or approximately upright position at station 20 where the plate 26 is backed by roller 30 carried by stationary bracket 31 mounted on base 32 at this station 20.

The mold member 26 has hinge 33 connecting the mold section 26 with opposing plate mold member 34. The frame 32 at the station 20 is a brace about the track 9 and carries, opposing the bracket 31, bracket 35 upon which is mounted cylinder 36 having piston 37. This piston 37 is normally retracted into the cylinder 36 by spring 38. This bracket 35 additionally carries cylinder 39 from which extends piston rod 40 to arm 41 having fixed pivot bearing 42 adjacent the tank overhang or boot 2. This arm 41 is an actuating arm of an angle lever having depending arm 43 having slot connection 44 with shear 4, for reciprocating such shear in guideway 45 transversely of the slot outlet 3 from the boot or overhang 2 so that the operator at the station 5 by means of control arm 46 may allow control of suction from line 47 by way of line 48 to the cylinder 39 for lowering piston rod 40 and thus effecting severing action of the shear 4 on the flow of glass from pool 49 to be delivered as a longitudinally extending gob 50 between the mold members 26, 34.

As such gather or horizontally extending gob of glass, as a molten mass, is dropping from the opening 3 as severed from the other glass by the shear 4, it falls toward the hinge 33. It is desirable to check this flow of glass in its descent. To this end, the operator in the station 5 may operate hand lever 51 to control flow of power fluid from the line 52 into the line 53 for actuating the piston 37 against the spring 38 so that roller 54 is thrust against the back of the mold member or plate 34 to swing such plate or member 34 on its hinge 33 toward and into parallelism with the plate member 26. It is desirable that the operator so time this closing action for this book type of mold, that the gather 50 of molten glass is engaged approximately centrally, or somewhat above the center of the mold region, and as so engaged the continuation of the closing action, as brought about by the piston and cylinder action of the device 36, 37, distributes this molten mass upwardly back along this course of descent, as well as downwardly toward the hinge 33 for approximating a minimum of flow in the mold for this mass of glass. There is momentum in this dropping gather and the timing of the mold section 34 may advantageously be to engage such gather above the central region, if not very close to the top, and thus so check the gravity fall and squeeze out the upper portion of such gather toward the top of the mold, there to have the excess flood out in a completion of the cast for the plate.

There is considerable severity or strain in this quick lunging action for the production of glass plate, and it is desirable rigidly to maintain the position of the mold members 26, 34. The bracket 31 is a material factor to such end, but in order that the freedom of travel of the wheels 13, 14, on the tracks 9 may not develop a lost motion to result objectionably the car shifting laterally when roller 54 swings the plate 34 on its hinge 33, there is provided additional holding means for the car 8. This is shown as comprising a bracket 55 carrying roller 56 coacting with fixed guide 57 carried by the bracket 35.

The mold members 26, 34, are shown as faced for providing a finished surface for the casting. To this end, these mold members 26, 34, are not only of a surface configuration for the plate, say as smooth for uniform thickness glass, but for a temperature holding characteristic which may be of such degree as not to detract from the fire finish or strain eliminated surface. This avoidance of excessive superficial cooling, which may detract from the degree of transparency, is herein avoided by the provision of electric heating elements 58 in the mountings or backers for the mold plates 26, 34, directly connected to the cars 8 by trolleys 16' which may be independently of the control devices 6, 7. There is, accordingly, here means for raising the degree of heat of these plates, and this degree is controlled by rheostat 59 as to each pair of these mold plates 26, 34. This degree may depend upon the thickness of the plate; the consistency of the molten charge; the frequency of receiving molten charge; as well as the composition of the glass. The thickness of the plate is determined by the hinge 33 which may be selected for the desired plate thickness in bringing the plate members 26, 34, into parallelism.

With this pressing or primary casting operation occurring at station 20, the cutting off of power air by the handle 51 releases the roller 54 so that the spring 37 may be effective for retracting such roller. The starter control 7 may be operated thus causing the car 8 to travel further counterclockwise and away from the charging station 20. In this travel, the guide 22 has connection with guide 23 giving the reverse rocking to the glass mold 26, 34, to that which the mold received in its travel to this station 20. Accordingly, the mold member 26 is swung into position on the rest 29 and the cast as thus freshly made is at once in the horizontal position tending to relieve any gravity strains which might tend to accrue if there were left the mass of glass in the vertical position. Accordingly, all the gravity load of this molten mass is directly taken in the thin direction of the casting and distributed throughout upon the plate 26. This travel from the station 20 may be to kick or impel the cars ahead to the station 21 or it may be that the car 8 from the station 20 has just shifted clear of the station 20 and the car in advance near the station 21 is individually moved from the station 21. The sequence of operations, is entirely under the control of the operator at the station 5, and there may be a casting of several blanks at the station 20 allowing such to be stored between the stations 20, 21, even for a time of more or less extensive annealing in the mold due to the controllable action of the heating elements 58. This extent of annealing may be proportional in time as desired by the extensiveness of the track 9. As the car 8 nears the station 21, bracket 59' on the mold member 34 has its rollers 60 (Fig. 11) engage fixed guide 61, and in traveling to the station 21, this guide 61 elevates the mold member 34 in swinging away from the horizontally disposed plate member 26 which still carries the cast. The plate member 34 is shown with side leaves 62 as limit means for the extent of the plate, in the casting operation. The lifting of the plate 34 clears these leaves 62 from the sides of the lower or supporting mold member 26. Adjacent the hinge there is loosely mounted on the plate member 26, angle member 63 (Figs. 8, 9) terminating in terminal plates 64 having trunnions 65. The plates 64 sustain the angle member 63 by rollers 66 as shiftable along track 67 in the casting of mold member 26.

The operator at the station 5 has available hand lever 68 (Figs. 1, 7) for controlling motive fluid to cylinder 69 and by operating such hand lever 68 may effect thrusting of the piston rod 70 away from the station 5 to carry fork 71 outward over rollers 72. This fork 71 terminates in prong pairs 73 for engaging the trunnions 65 and effecting a slight lift and thrusting forward of the angle member 63 thus to shift the cast plate 74 off the mold member 26 through leer charging door 75 into leer chamber 76 upon conveyor 77 in such leer. The hand lever 68 may be operated to retract the fork 71 thus to reset the angle member 63 adjacent the hinge 33 of the plate casting mold. The operator in the station 5 may then continue the counterclockwise travel of this car 8 so that guide 78, as a continuation of the guide 61, may lower the upper plate member 34 against the lower plate member 26. This travel of the mold may stop as leaving the station 21, and another car 8 be taken up as adjacent the station 21 and moved into the station 20 for a repetition of this cycle of operations, wherein the guide 22 swings the closed mold from horizontal position as the member 26 rests upon the ledge 29 to vertical position as coming into station 20 with the mold member 26 backed up by the roller 30.

The controller 59 for the heating element has cable connection 79 permitting this swinging action of the plate members with the control for the heating elements therein as adjusted to the desired temperature maintenance for these plates. At this entrance into the station 20, with the plate 26 in the upright position, the mass of the plate 34 is upward from the hinge 33 and this plate 34 at once falls to a slightly opening position against the roller 54 and all is in readiness for a repetition of the cycle of operations. The handle 46 is then swung for connecting power fluid line 52 to the motive line 48, thus effective for thrusting upward the piston rod 40 and shifting the shear 4 for opening the way 3 to allow a flow of molten glass from the pool 49 to descend toward the open book mold 26, 34. As the gather quantity descending approximates that for the mass of the casting, the handle 46 is manipulated to connect the suction line 47 thus to bring about a shearing action and the closure of the mold is at once effected by the handle 51 for shaping this gather into the desired form of casting, as a sheet or plate of transparent glass.

The interval of the glass in the mold as disposed into horizontal position, may be of short duration if it be desired to conduct the full annealing in the annealing chamber 76. In the event the heating elements 58 are to operate for the finish annealing of the cast in the mold, then the chamber 76 of the annealing oven may be used for the final cooling operations only. In either event, the final surface of the glass plate or sheet may be finished directly by the mold for its final surface even without supplemental grinding or polishing.

What is claimed and it is desired to secure by United States Letters Patent is:

1. The method of forming glass sheets comprising forming a gob of greater extent horizontally than vertically, and catching said gob in its descent to increase its vertical extent both upward and downwardly from the point of catching.

2. The method of forming glass sheets comprising forming a gob of greater extent horizontally than vertically, catching said gob in its descent to increase its vertical extent, and at once causing said molten glass to have its extent in a horizontal plane for removing weight strains in the direction of the extent of the sheet.

3. The method of forming glass sheets comprising forming a gob of greater extent horizontally than vertically, catching said gob in its descent to increase its vertical extent, at once causing said molten glass to have its extent in a horizontal plane for removing weight strains in the direction of the extent of the sheet, and slowing up the cooling of said horizontally extending sheet by heating.

4. The method of forming glass sheets comprising forming a gob of greater extent horizontally than vertically, catching said gob in its descent to increase its vertical extent, at once causing said molten glass to have its extent in a horizontal plane for removing weight strains in the direction of the extent of the sheet, and heating said horizontally extending sheet to finish its surface.

5. A receiver for a horizontally extending strip of molten glass comprising upwardly diverging plate mold members, means for bringing said members into parallelism as a closed mold, and an orienting device for bringing said closed mold members into horizontally extending position.

6. A receiver for molten glass comprising upwardly diverging plate mold members, means for bringing said members into parallelism as a closed mold, an orienting device for bringing said closed mold members into horizontally extending position, and a heater for the mold.

7. A receiver for molten glass comprising outwardly diverging plate mold members, means for bringing said members into parallelism as a closed mold, an orienting device for bringing said closed mold members into horizontally extending position, and heating means for each of the plate members of the mold.

8. Glass manufacturing apparatus comprising a series of mold carriers for the molds in a circuit, and independent actuating means for the different carriers, one on each carrier, for shifting said carriers relatively to each other along said circuit.

9. Glass manufacturing apparatus comprising a series of mold carriers for the molds in a circuit, actuating means for shifting said carriers relatively to each other along said circuit, one of said means being on each of said carriers, and directing means for operating the molds during shifting.

10. Glass manufacturing apparatus comprising a series of molds, carriers for the molds in a circuit, independent actuating means for the different carriers, one on each carrier, for shifting said carriers relatively to each other along said circuit, and directing means for operating the molds independently of said shifting.

11. In the manufacture of sheet glass, the forming of a flat gather, the dropping of said gather into an upwardly open mold pocket, and the closing of such pocket about said gather.

12. A receiver for molten glass comprising a pair of plate mold members, a horizontally extending hinge axis therebetween connecting said members to permit said members to move into parallel relation to form a plate cast for molten glass therebetween, heating means for each plate member mounted in fixed relation thereto, and a control for the heating means as to which the plate members are movable.

13. A receiver for molten glass comprising a first plate mold member, a second plate mold member movable into opposing relation with the first plate mold member to form a plate cast for molten glass therebetween, heating means for the movable member connected in fixed relation thereto for movement therewith, and a control for the heating means as to which the plate members are movable.

14. A receiver for molten glass comprising a plate sustaining member, a roller mounting permitting horizontal shifting of said member to move with a plate of glass for cooling thereon, heating means for said plate member mounted in said member in fixed relation thereto, and a control for the heating means for checking the rate of cooling of said glass.

15. In apparatus for forming sheet glass, a series of molds each comprising oppositely disposed mold plates, directing means for positioning each mold in receiving position with its mounting spaced substantially vertical, controllable means adjacent said receiving position for operating upon each mold for moving a mold plate in receiving position toward an opposing mold plate, carrier means to move the molds from receiving position, and heating means within said opposing mold plates for retarding the rate of cooling of the glass therein.

16. In apparatus for forming sheet glass, a series of molds each comprising two mold plates hinged together adjacent one edge, directing means for placing each mold in receiving position with its hinged side downward and with the plates diverging upwardly, manually operable controlling means adjacent the receiving position for bringing said plates into parallelism as a closed mold, orienting means for moving the molds into a substantially horizontal position for the respective formed sheets therein, controllable heating means in the sheet sustaining plates, and carrier means for the plates and heating means from said receiving position.

In witness whereof I affix my signature.

FRANK S. WHITLOCK.